May 29, 1928.

T. MIDGLEY 1,671,305

METHOD AND APPARATUS FOR FOLDING PRESSURE BAGS

Filed May 20, 1927 6 Sheets-Sheet 1

INVENTOR.
Thomas Midgley
BY
Edward C. Naylor
ATTORNEY.

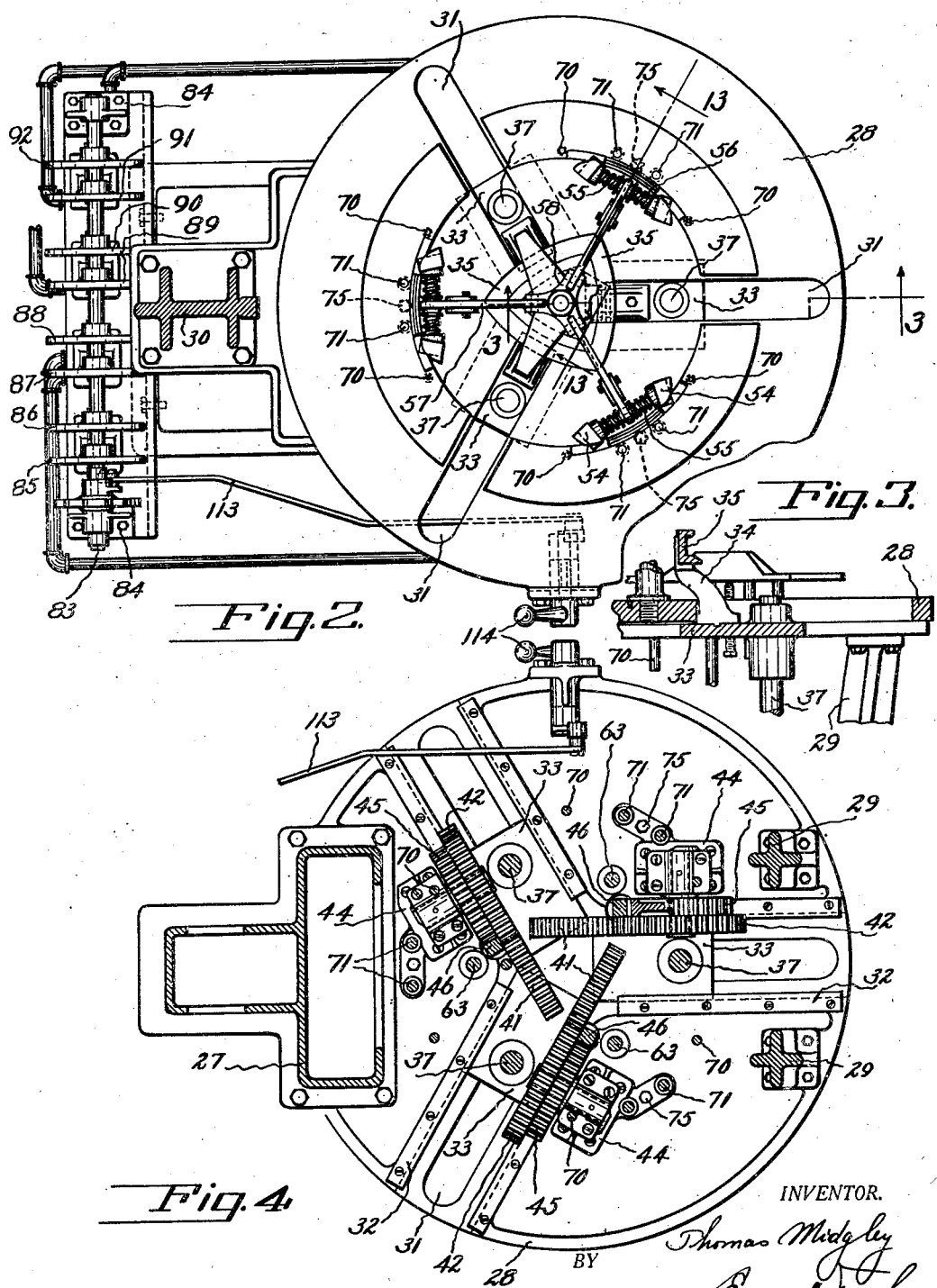

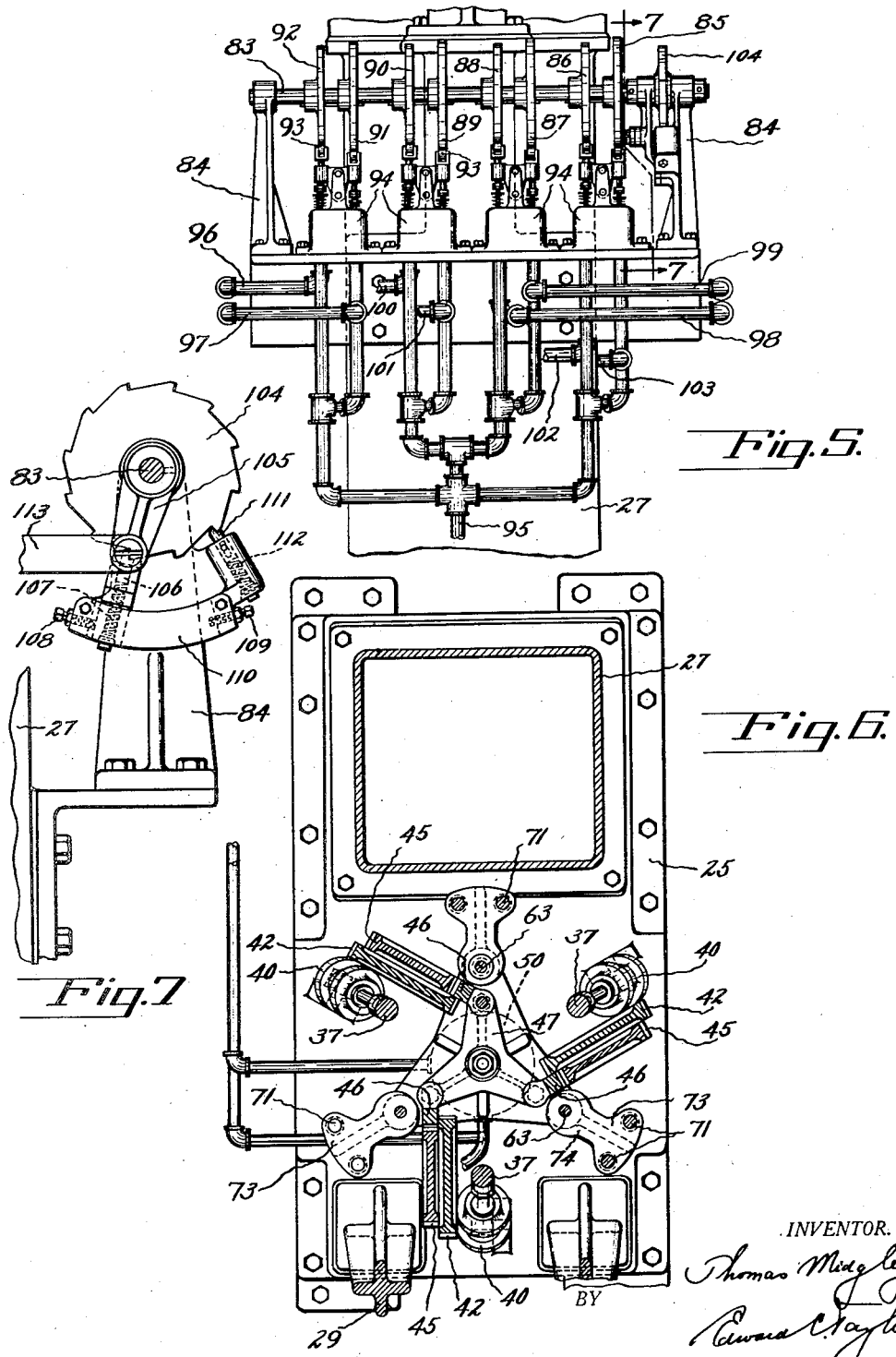

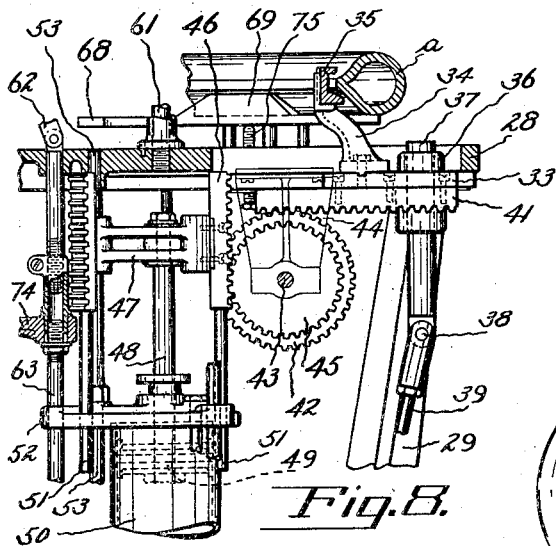
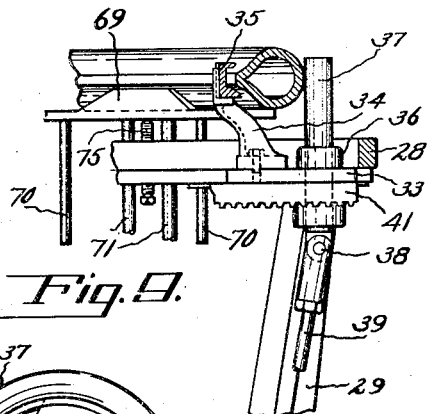
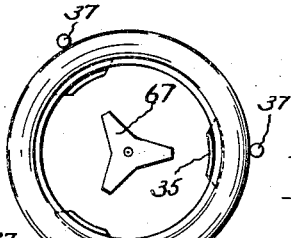
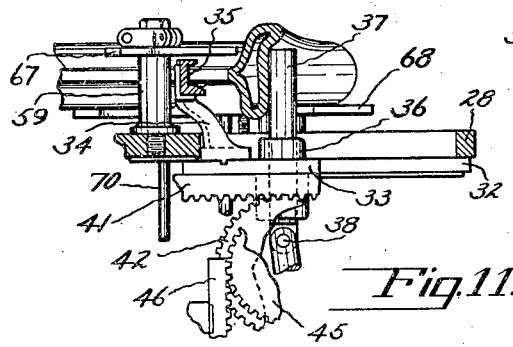
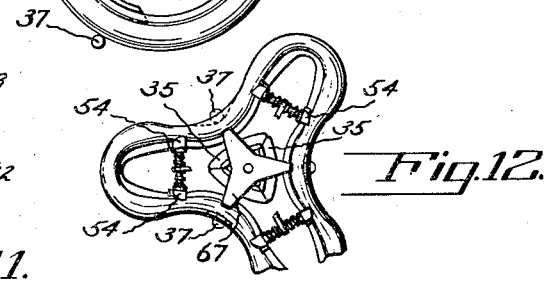
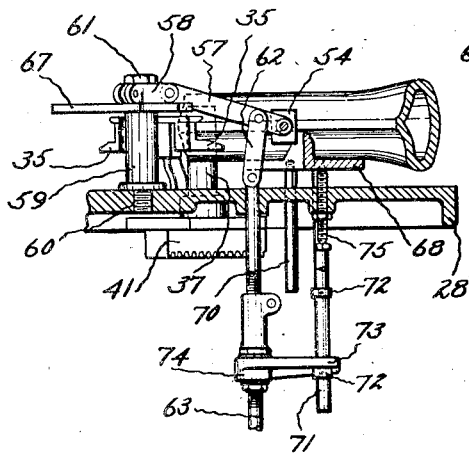
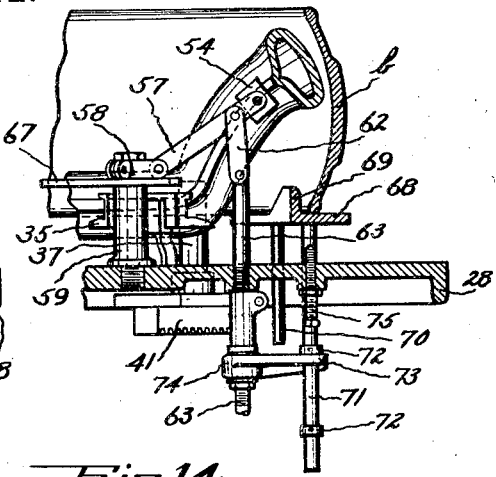

May 29, 1928.　　　　　　　　　　　　　　　　1,671,305
T. MIDGLEY
METHOD AND APPARATUS FOR FOLDING PRESSURE BAGS
Filed May 20, 1927　　　　6 Sheets-Sheet 5

INVENTOR.
Thomas Midgley
BY
Edward C. Naylor
ATTORNEY.

May 29, 1928.  T. MIDGLEY  1,671,305

METHOD AND APPARATUS FOR FOLDING PRESSURE BAGS

Filed May 20, 1927  6 Sheets-Sheet 6

INVENTOR.
Thomas Midgley
BY
Edward C. Taylor
ATTORNEY.

Patented May 29, 1928.

1,671,305

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR FOLDING PRESSURE BAGS.

Application filed May 20, 1927. Serial No. 192,896.

The invention relates to a method and an apparatus for folding internal pressure bags preparatory to their insertion in a partially shaped tire casing. Generally this work has been done by hand but some machines have been proposed for giving the necessary folding to the bag. It is the object of my present invention to improve upon these prior practices and machines in various particulars. As one instance, my method and machine fold the bag so as to avoid cracking of the base of the bag which has been a source of considerable trouble in the use of prior devices. As another instance, my improved device guides the folded bag into the proper registration with the tire casing. As still another instance, my improved device smooths out the bag within the tire after the two have been assembled, thereby getting the bag and tire accurately positioned with regard to each other.

Referring to the drawings:

Fig. 2 is a section on line 2—2 of Fig. 1;

Fig. 3 is a section on line 3—3 of Fig. 2;

Fig. 4 is a section on line 4—4 of Fig. 1;

Fig. 5 is a partial rear view of parts shown in Fig. 1;

Fig. 6 is a section on line 6—6 of Fig. 1;

Fig. 7 is a section on line 7—7 of Fig. 5;

Fig. 8 is a section roughly corresponding to Fig. 3 but illustrating more of the mechanism and showing the parts in a different position of operation;

Fig. 9 is a similar view showing a later stage of operation;

Fig. 10 is a diagrammatical plan view illustrating the same condition of parts as shown in Fig. 9;

Fig. 11 is a view similar to Fig. 9 but showing a later stage of operation;

Fig. 12 is a view similar to Fig. 10 but showing the parts in the position of Fig. 11;

Fig. 13 is a section on line 13—13 of Fig. 2 but with the parts shown in the same condition as in Fig. 11;

Fig. 14 is a view similar to Fig. 13 but showing the parts in a subsequent stage and showing the partially expanded tire casing placed about the folded bag;

Figure 15:
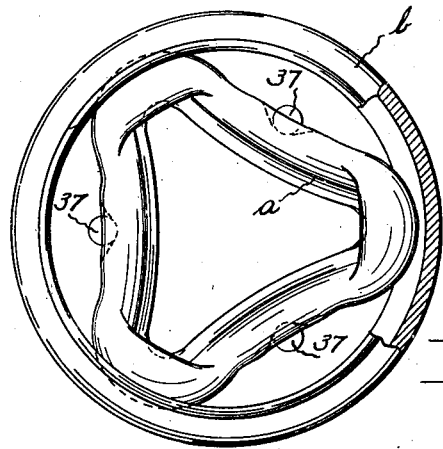
Fig. 15 is a top plan view illustrating the bag and tire in the condition of Fig. 14.
Figure 16:
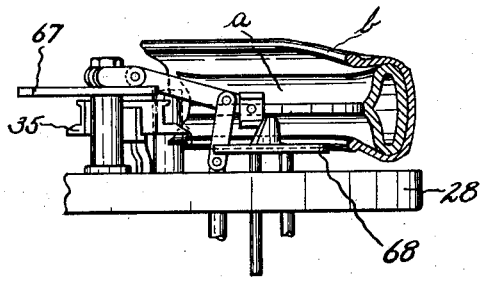
Fig. 16 is a view similar to Fig. 14 but showing the parts in a later stage of operation.
Figure 17:
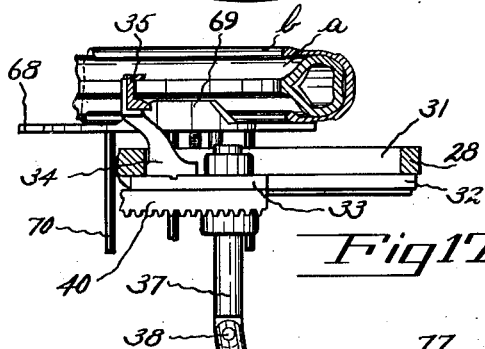
Fig. 17 is a view similar to Fig. 11 showing the parts in the condition of Fig. 16.
Figure 18:
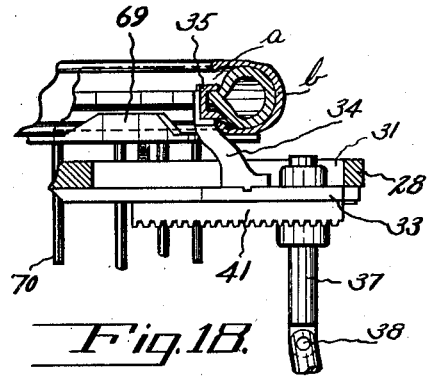
Fig. 18 is a similar view showing a still later stage of operation.
Figure 19:
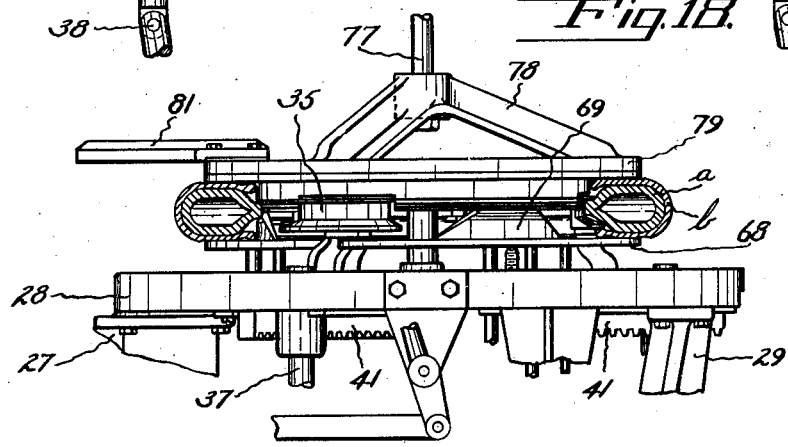
Fig. 19 is a side elevation of a portion of the mechanism, the tire and bag being shown in section, illustrating the action of the tire pressing and centralizing device.

Before considering the mechanism the method in which the bag is folded will be considered briefly. The first step in the method is to buckle the bag inwardly as shown in Figs. 10 and 12. This is preferably done at three points around the circumference of the bag so that the latter is folded into somewhat the form of a clover. This likeness is made even more evident in the next step which is to fold upwardly as in Figs. 14 and 15 the outwardly extending parts of the bag corresponding to the leaves of the clover. This upward movement reduces the outside circumference of the bag even more than the original buckling and permits the tire to be placed around the bag without touching it, as best shown in Fig. 14. The bag is then allowed to expand into the interior of the casing as indicated in Fig. 16. Finally the bag is stretched out into the casing as in Fig. 18 and the tire and bag given a sidewise pressure as in Fig. 19, the combination of these two actions being to smooth out the bag in the casing and centralize them with respect to each other.

The mechanism comprising the machine for carrying out the above method is mounted upon a base 25 supported upon pedestals 26 and carrying a main frame 27. Upon this main frame is a circular table 28 upon which most of the parts directly operating upon the bag are carried, this table being supported by struts 29 running to the base.

Also carried upon the main frame is an over-hanging stanchion 30 which serves to carry the device for giving the sidewise pressure to the bag and the casing after they have been assembled.

Three slots 31 are formed in the table 28 positioned each 120° from the other and fitted at the bottom with ways 32. In these ways move slides 33 having upstanding brackets 34 extending through the slots which, as shown in Fig. 8, engage the inner periphery or base of the bag a. Also formed in each slide 33 is a bearing 36 from which runs a folding pin 37 having a lowered or inactive position as shown in Fig. 8 and raised or active position as shown in Fig. 9. These folding pins are each pivoted at their lower end, as at 38, to a piston rod 39 carrying a piston (not shown) running in a cylinder 40 which is secured by a pivotal connection to the base 25.

The slides are moved regularly out or in the slots 31 by racks 41 which are carried on their lower surfaces and which each engage a gear 42 mounted upon a short shaft 43. This shaft is held in a bracket 44 and carries a second gear 45 meshed with a vertical rack 46. The three racks 46 are mounted upon a common crosshead 47, best shown in Figs. 6 and 8, rigidly secured to the top of a piston rod 48. At the lower end of the piston rod is a piston 49 running in a pneumatic cylinder 50 to which air under pressure is supplied as will be described later. To the racks are secured guide rod extensions 51 which pass through holes in a spider 52 secured to the top of the pneumatic cylinder in such a manner as to keep the racks in alignment with their respective gears. A rod 53 is fastened in the circular table 28 and also in the spider 52 and passes loosely through a hole in the crosshead so as to give an additional guiding action upon the latter. If air is introduced into the cylinder 50 underneath the piston the racks 46 are raised causing rotation of the shafts 43 and a consequent simultaneous radially outward movement of the slides 33 and the parts carried thereby.

The upward folding of the bag after it has been buckled is accomplished by shoes 54 shaped to grasp the base of the bag and shown best in Figs. 2, 13 and 14. These shoes are mounted in pairs by means of springs 55 upon rods 56 secured to the ends of levers 57. These levers are secured to a bracket 58 borne by a post 59 which is fastened by a stud 60 and a nut 61 to the top of the table 28. Each of the levers is pivoted to a pair of links 62 which are in turn pivoted to the top of a rod 63. The three rods 63 are fastened to a crosshead 64 located at the bottom of the machine and carrying a piston rod 65 running in a pneumatic cylinder 66. This cylinder is conveniently formed as a continuation of the cylinder 50, the two being separated by a suitable partition and having separate inlet and outlet pipes. Also secured to the post 59 are a series of three hold-down plates 67 all extending radially at points intermediate of the shoes 54 as perhaps best shown in Fig. 12.

The bag is initially positioned in the machine by an annular plate 68 which also serves at a later stage of the operation to give the tire the correct position relative to the bag. This plate carries upstanding flanges 69 suitably cut away to permit the centering plates 35 to act through them and serving to properly centralize the bag with respect to the axis of the machine. The plate 68 is carried upon rods 70 which extend freely through holes in the table 28 and serve as guides for keeping the plate in proper position. The plate is given a vertical movement at certain stages of the operation by rods 71 also passing through holes in the table 28, but carrying at their lower ends spaced collars 72. Each pair of collars is positioned so as to lie on opposite sides of an arm 73 projecting from a bracket 74 upon one of the rods 63 and suitably apertured so as to permit the passage of the rod 71. By this means, as shown in Figs. 13 and 14, a lost motion connection between the rods 63 and the rods 71 is provided, the rods 63 and consequently the shoes 54 having a considerable upward motion before the plate 68 moves—the latter having only a relatively slight vertical movement.

When in its lowermost position the plate 68 rests upon stop screws 75 secured in the table top and serving to give accurate registration to the bag. Accurate adjustment of the uppermost position of the plate is secured by making the brackets 74 adjustable upon the rod 63, the example shown being of a threaded connection.

After the tire has been positioned about the folded bag and the bag released, which operation will be more fully considered below, the tire is given a sidewise pressure by means of a mechanism operated by a pneumatic cylinder 76 supported on the stanchion 30. This mechanism is most clearly shown in Fig. 1. In the cylinder runs a piston having a rod 77 bearing at its lower end a spider 78. To this spider is secured the tire pressing plate 79 having downwardly extending flanges 80 corresponding to the flanges 69 and the plate 68. A guide plate 81 is secured to the plate and is notched to run on ways 82 fastened to the stanchion by which means the plate is prevented from rotating and given additional guiding. If air is introduced above the piston the plate will be pressed down against the tire while if air is introduced underneath the piston it will be raised clear of the tire into the position of Fig. 1.

The sequence of operations is controlled by a manually operated cam mechanism. It would be simple if desired to have this cam mechanism automatically advanced step by step by some power connection but it is generally preferable to operate it manually as this gives the workman a more constant opportunity to inspect the progress of the work and to interrupt the sequence of operations at any time when the folding or insertion of the bag is not proceeding satisfactorily. The cam mechanism is carried upon a shaft 83 mounted in brackets 84 secured to the main frame 27 and carries a series of eight cams which in the drawings are numbered consecutively from 85 to 92. Each of these cams operates a roller 93 associated with air valves 94 of any standard or desired type. The valves have a common source of compressed air indicated by the pipe 95 (Fig. 5) and have separate outlets by which this common source may be connected either below or above the piston of any of the operating cylinders. The valve mechanism is arranged in pairs and the valves are constructed so that when any of the outlet pipes are not connected to the source of compressed air they are vented to the atmosphere and the opposite side of the cylinder connected to the source of fluid pressure.

The general arrangement of pipes is shown in Fig. 5 in order to clarify the association with the different cam surfaces. Pipes 96 and 97 are respectively operated by the cam surfaces 92 and 91 and are connected respectively to the lower and upper inlets on the upper central cylinder 50. Pipes 98 and 99 are similarly under the influence of cams 88 and 87 and run to the lower and upper inlets of the lower central cylinder 66. Pipes 100 and 101 are controlled by cam surfaces 90 and 89 and run to the lower and upper inlets of the three small cylinders 40 which control the folding pins 37. Pipes 102 and 103 are controlled by cams 86 and 85 and run to the upper and lower inlets, respectively, of the cylinder 76 which controls the tire pressing plate 79.

The shaft 83 which carries the series of eight cams has secured to it near one end a ratchet wheel 104 and has pivoting freely about it a pawl arm 105. This arm bears a pawl 106 pressed into contact with the surface of the ratchet wheel by a spring 107. The pawl arm has a definite angular motion limited in either direction by stops 108 and 109 on a segment 110 secured to the bracket, this angular motion being equal to one-twelfth of the circumference of the ratchet, the latter being provided with twelve teeth. In order to prevent retrograde movement of the ratchet a detent 111 is mounted to the segment 110 and is pressed against the ratchet by a spring 112. A link 113 is secured to the pawl arm 105 and is joined to a handle 114 (Fig. 1) pivoted adjacent the table 28. Each oscillation of the handle 114 by the operator causes the parts of the machine to perform an additional step and to remain in this new position until the handle is again moved.

Figure 1:
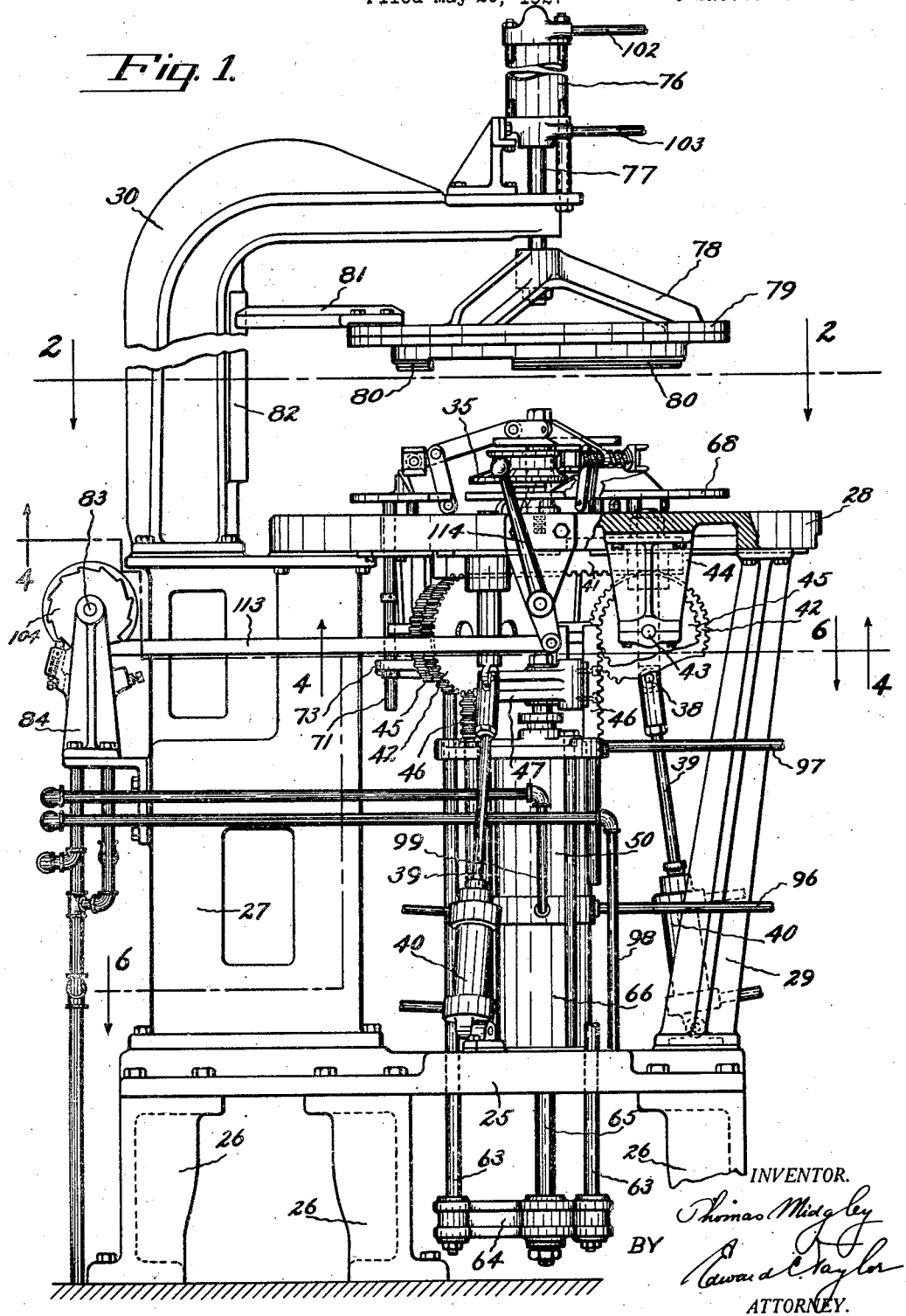
Fig. 1 is a side elevation of a machine embodying my invention.
Figure 20:
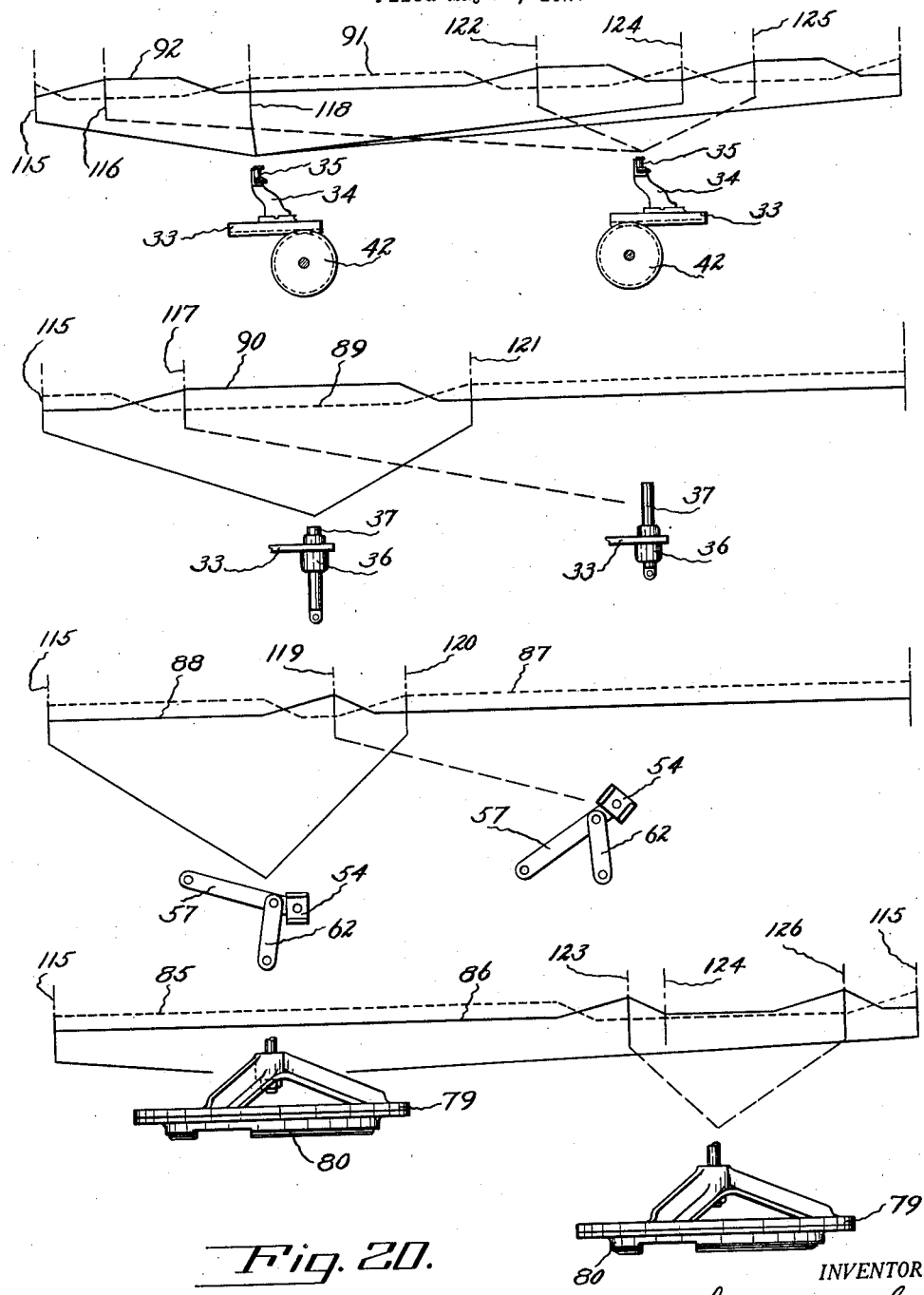
Fig. 20 is a diagram showing developments of the several cam surfaces employed in the machine together with diagrammatic positions of the parts which they control.

At the start of the bag folding operation the parts of the machine are in the position of Fig. 1. A bag $a$ is then manually placed upon the plate 68 in a position encircling the centering plates 35 as shown in Fig. 8. The operator then moves the handle 114 causing the cam shaft 83 to rotate one-twelfth of a revolution. Fig. 20 shows a development of the several cam surfaces, the paths being numbered to correspond with the cams shown in Fig. 5. This figure also shows the position of the parts controlled by the cams at the completion of each operation of the handle, these diagrammatic figures being connected to the cam paths by lead lines. The start of the operation is indicated at 115 and the position after the first actuation of the handle at 116. This first operation of the cam causes air to be admitted underneath the piston of the cylinder 50, moving the centering plates 35 radially outwardly as shown in Fig. 8, thereby insuring that the bag is centralized with respect to the mechanism. The next operation of the handle is indicated at 117 (Fig. 20) and serves to admit air underneath the pistons of the three small cylinders 40 so as to raise the folding pins 37. Following this the third handle actuation brings the parts to the position of Figs. 11 and 12, indicated at 118 in Fig. 20. In this operation the slides 33 retract carrying with them the raised folding pins 37 and folding the bag inwardly at three points. Besides folding the bag in order to reduce its circumference somewhat this operation draws the inner portion of the bag into contact with the shoes 54 as clearly indicated in Fig. 12.

The next succeeding operation of the handle is indicated in Fig. 20 as 119, and admits air under the piston in the lowermost cylinder 66, causing the rod 63 to rise and the shoes 54 to be raised. This gives an additional folding to the bag best shown in Figs. 14 and 15. The next operation is not done by the machine and consists of the positioning of the tire about the bag. The tire casing $b$ has been shown as one made in flat band form and partially shaped by means of a suitable expander. A tire of this character can readily be placed about the folded bag and has been shown in Fig. 14 with its lower edge resting on the plate 68 which has been raised in the preceding operation to a position slightly above that which it assumed when the bag was first applied.

After the positioning of the tire the handle is again moved to cause the parts to come to the position shown in Fig. 16 and indicated on Fig. 20 as 120. From a mechanical standpoint this causes the shoes 54 to return to their lowermost position, while from the standpoint of the effect on the bag it permits the latter to stretch out into the tire casing at those points not restrained by the folding pins 37. On the next succeeding handle operation indicated on Fig. 20 as 121, the pins 37 are again caused to withdraw from contact with the bag and the latter then snaps out of its own elasticity, roughly conforming to the inside of the casing and causing the latter to more closely approach its final shape.

Succeeding operations are not concerned with the placing of the bag within the tire, this having already been accomplished, and if desired the tire and bag can be removed from the machine at this point. It is preferable, however, to straighten out the bag further before the tire and bag are placed in a mold for vulcanizing and my machine is particularly intended for securing accurate registration of the tire and the bag. For this purpose the handle is again moved into the position shown at 122 in Fig. 20, this performing exactly the same operation as in the position 166, that is to say, the slides 33 are caused to move radially outwardly and the bag given a slight centralizing stretch outwardly. The next position 123 causes the plate 79 to descend, air being admitted to the top of the cylinder 76 for this purpose by the cam controlled valves.

At 124 the cams 86, 91 and 92 are all operated. At this point only in the operation of the machine are the cams not operated in pairs. As stated above the valves are arranged so that their connections to the respective cylinders are vented to the atmosphere at times when these connections are not joined to the source of compressed air. In all other periods of the operation when the top of one cylinder is joined to the compressed air the lower end is ventd and vice versa. At the position 124, however, the cam 86 and not its sister cam 85 is made operative. In other words the top of the cylinder 75 is vented to the air but the bottom is not connected to the source of pressure. This operates simply to release the pressure of the plate 79 against the side of the tire without at the same time moving this plate upwardly. Simultaneously with this action the centering plates 35 are released. Immediately afterwards, however, as indicated at 125, centering plates 35 move outwardly while the tire is still loosely held by the plate 79 and directly after that at 126 the plate 79 is again pressed downward. This repeated operation of stretching and pressing has been found to give an unusually accurate centering of the bag in the tire casing, much preferable to the usual pounding with a mallet. The last handle actuation brings the parts to the original position indicated at 115.

Having thus described my invention, I claim:

1. A method of folding an annular pressure bag prior to insertion in a tire casing which comprises buckling the bag radially inwardly at a plurality of points, leaving outwardly extending lobes, and folding the lobes out of the plane of the bag.

2. A method of inserting an annular pressure bag in a tire casing which comprises buckling the bag radially inwardly at a plurality of points leaving outwardly extending lobes, folding the lobes out of the plane of the bag, positioning the tire casing around the lobes, and permitting the bag to straighten out within the interior of the tire.

3. A method of inserting an annular pressure bag in a tire casing which comprises folding the bag, positioning and releasing the bag within the tire, and flattening the tire and bag laterally and simultaneously throughout its circumference.

4. A method of inserting an annular pressure bag in a tire casing which comprises folding the bag, positioning and releasing the bag within the tire, and alternately compressing the tire and bag laterally and stretching the bag radially to cause the bag to lie smoothly and concentrically within the tire.

5. A machine for folding annular pressure bags which comprises a plurality of folding devices spaced symmetrically around the outer periphery of the bag, means for moving the folding devices radially inwardly to buckle the bag into a lobed figure, and means to fold the lobes of the bag at an angle to the plane of the bag.

6. A machine for folding annular pressure bags which comprises means to center a bag in the machine, a plurality of folding devices spaced symmetrically around the outer periphery of the bag, means for moving the folding devices radially inwardly to buckle the bag into a lobed figure, and means to fold the lobes of the bag at an angle to the plane of the bag.

7. A machine for folding annular pressure bags comprising a plurality of radially movable slides, each having a folding pin projectable into and out of the plane of the bag, and a centering device to engage the inner periphery of the bag, means to move the slides radially in either direction, and means to move the folding pins into or out of the plane of the bag.

8. A machine for inserting annular pressure bags in tire casings comprising means to fold a bag, means to position a tire casing around the folded bag, means to release the bag to permit it to expand into the tire, and means to compress the tire and bag transversely in order to even out the bag within the tire.

9. A machine for folding annular pressure bags comprising opposed sets of bag folding means arranged in staggered relation around the bag, and means for moving the sets relative to each other both radially and in a direction transverse to the plane of the bag, whereby a bag engaged by said sets will be folded into a lobed figure with the lobes bent at an angle.

10. A machine for folding annular pressure bags comprising two sets of folding members, one set having folding members spaced around the outer periphery of the bag and the other set having folding members staggered with respect to the members of the first set and spaced around the inner periphery of the bag, and means for moving the members of the first set radially inwardly and the two sets relative to each other in a direction transverse to the plane of the bag.

THOMAS MIDGLEY.